United States Patent [19]
Lori

[11] 4,012,863
[45] Mar. 22, 1977

[54] DOWNRIGGER RELEASE

[76] Inventor: John Lori, 14145-138th Ave., Grand Haven, Mich. 49417

[22] Filed: Mar. 12, 1976

[21] Appl. No.: 666,189

[52] U.S. Cl. .............................. 43/43.12; 43/43.11
[51] Int. Cl.² ...................................... A01K 95/00
[58] Field of Search ............. 43/43.12, 43.11, 44.9

[56] References Cited
UNITED STATES PATENTS

| | | | |
|---|---|---|---|
| 2,498,815 | 2/1950 | McVay | 43/43.11 |
| 3,861,074 | 1/1975 | Wood | 43/43.12 |
| 3,874,110 | 4/1975 | Larson | 43/43.12 |

*Primary Examiner*—Warner H. Camp
*Attorney, Agent, or Firm*—Price, Heneveld, Huizenga & Cooper

[57] ABSTRACT

A release assembly for supporting and holding a fishing line to a downrigger line assembly below the water includes a support assembly having a socket formed therein. A special fitting received in the socket holds the fishing line until a hooked fish pulls the fitting from the socket. Maintenance of upward force on the fishing line holds the fitting in the socket to carry the lure attached to the line to the desired depth. Relaxation of the force on the line allows the fitting to release from the socket thereby releasing the line allowing freedom of the line to play the fish.

18 Claims, 8 Drawing Figures

DOWNRIGGER RELEASE

BACKGROUND OF THE INVENTION

This invention relates to fishing apparatus and more particularly to downrigger release devices for releasably attaching a fishing tackle line to the downrigger weight line to maintain the line at the desired depth while trolling and for releasing the line when a fish strikes.

In the past, fishing apparatus particularly of the type used in sport fishing where a heavy weight is utilized at the end of a downrigger cable or line have been bulky, cumbersome and usually include one or more moving parts operable to release the fishing line from the downrigger. Release devices having moving parts are susceptible to corrosion, breakdowns and the loss of such parts through vibration and the like, all of which prevented the proper and timely release of the line from the downrigger at the time when a fish strikes. Typically also, devices known in the prior art usually firmly either grasp the line by pinching the line between two points or include a fitting on the line which in turn is fixed to an accessory mounted on the downrigger. As a result, when a stike occurs, a sudden force is applied to release the line from the holding mechanism which often caused the line to break. Since most of the prior devices use frictional holding or other mechanical devices to hold the line, it precludes the the use of light fishing tackle since there is a great possibility of breaking the line.

SUMMARY OF THE INVENTION

The present invention provides an apparatus for releasably supporting a fishing line on a downrigger assembly. In one embodiment, the release apparatus of the invention includes a support member adapted for mounting to the downrigger weight line either above the weight or the support may form an integral part of the weight itself. The support member is equipped with an extending portion forming a socket. The socket opens downwardly toward the weighted or lowermost end of the weight line. A fitting having end portion at least one of which is received in the socket has means formed therein to receive and hold the fishing line. The means for receiving the fishing line is positioned generally between the ends of the fitting. The fitting is held in the socket with maintenance of a force on the fishing line in a direction opposite to the weighted end, i.e., an upward force. The fitting and the line attached thereto is releasable with relaxation of the upwardly directed force or it also releases when a fish strikes the lure carried by the line.

In another embodiment of the invention, the release apparatus including the socket and fitting is positioned on the weight assembly. The fitting, received at one end in the socket, is pivotally mounted at its other end. Means are provided on the fitting to releasably receive the fishing line. When the line is released from the fitting as the end pivots out of the socket, the fitting remains attached to the weight assembly. As in the previous embodiments, the fitting is maintained in position in the socket with maintenance of an upward force on the fishing line and is releasable with relaxation of the force or when a fish strikes the lure.

The construction, operation and many features and advantages of the invention will become readily apparent to those skilled in the art upon reading the following specification and with reference to the accompanying drawings.

DESCRIPTION OF THE PREFERRED EMBODIMENT

Figure 1:
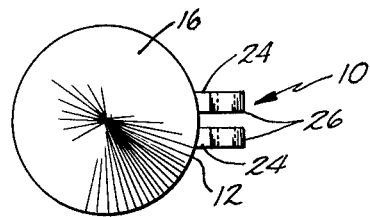
FIG. 1 is a top view of a first embodiment of the invention wherein the support member is integrally formed with the weight assembly.
Figure 3:
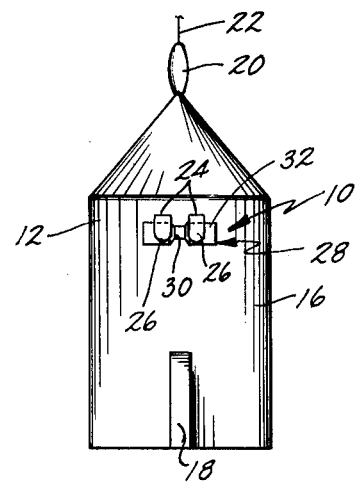
FIG. 3 is a side view of the invention as shown in FIGS. 1 and 2.
Figure 2:
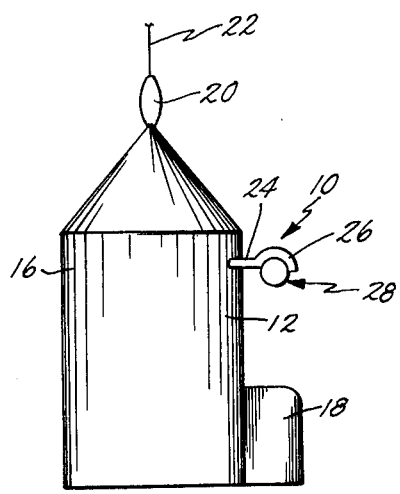
FIG. 2 is a plan view of the invention as shown in FIG. 1.

Referring now to the drawings and in particular to FIGS. 1-3, the release mechanism, generally designated by the numeral 10, includes a support member 12 adapted for mounting on the downrigger assembly 14. The downrigger assembly as its name implies, includes a weight element 16 having generally any desired configuration. A stabilizing fin 18 may also be provided near the base of the weight. Weight 16 is fixed in a conventional manner as by means of a hook 20 integrally formed therewith to the downwrigger suspension line 22.

Figure 6:
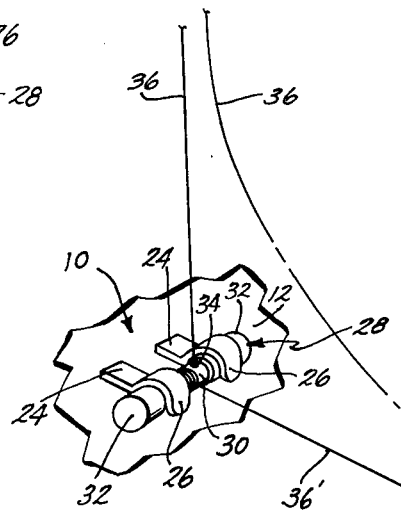
FIG. 6 is a fragmentary somewhat schematic view of a portion of the invention illustrating the operation of the release mechanism.

Support member 12 illustrated in somewhat greater detail in FIG. 6 includes a pair of outwardly extending, spaced apart leg members 24. The outermost or free end of legs 24 is curved as indicated at 26 to form a pair of spaced socket members. The socket formed in the bifurcated legs 24 may be formed as an integral part of weight 16 or may be a separate assembly attached in any convenient manner. A fitting element 28 adapted to fit in the sockets has a reduced center portion 30 and enlarged outer ends 32. The enlarged outer ends 32 have a radius of curvature conforming generally to the shape of the socket forming curved portions 26 formed on legs 24. The fitting ends 32 are received in the socket. An opening 34 extending transversely through the reduced diameter center portion 30 of the fitting element is provided to receive the fishing line 36.

In use, the line 36 is threaded through opening 34 and the line is wrapped one or more turns around the reduced center portion 30 to fix the line with respect to the fitting. The fitting element is then positioned in the socket as illustrated. So long as an upward force is mainained on fishing line 36, the fitting will remain in the socket. The amount of line 36' extending from the fitting element may be of any desired length and, of course, a lure 38 is secured to the end of the fishing line.

When a fish strikes the lure, the force thereon is sufficient to pull the fitting from the socket such that the line is free to play the fish. As the fitting is released, the line will unwind from the fitting and swivels freely about the line while the fish is being played.

Figure 4:
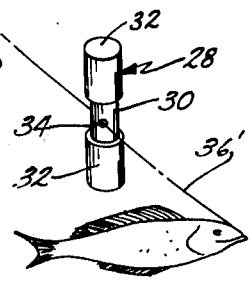
FIG. 4 is a modification of the invention wherein the support assembly is adapted for connection between the weight and the downrigger suspension line.
Figure 4:
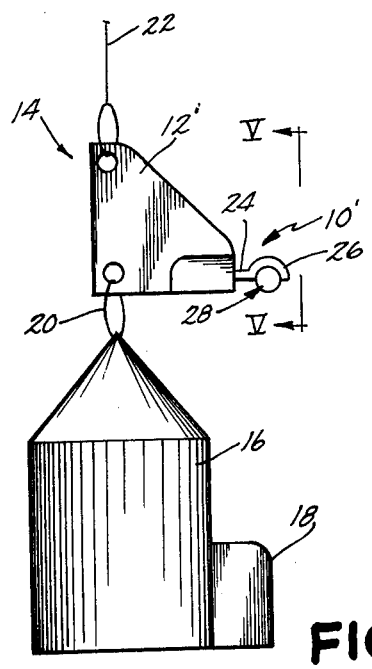
Figure 5:
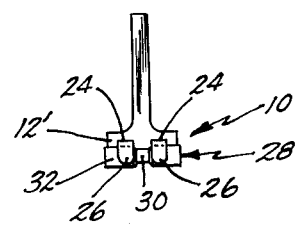
FIG. 5 is a view taken along the line V—V of FIG. 4.

In the embodiment of FIGS. 4 and 5, the release mechanism generally designated by the numeral 10' is formed as a separate member connected between suspension line 22 and the weight 16. Release mechanism 10' may take any desired configuration, however, preferably it is formed so that the support member 12' is a separate generally flat plate-like member for easy movement through the water during trolling. As in the previous embodiment, the release mechanism includes a socket construction formed in the curved end portions 26 of the spaced legs 24 and a fitting element 28 constructed in accordance with that previously described. Fitting 28 is also equipped with an opening 30 (not shown) through which the fishing line is positioned. The operation of the embodiment illustrated in FIGS. 4 and 5 is identical to that previously described. In this embodiment, however, because the support member 12' is a separate element rather than an integral part of the weight, a rather inexpensive and convenient conversion kit is provided for utilization with existing weights and suspension lines of conventional fishing tackle. The support member 12' is simply positioned on the suspension line 22 above the weight 16.

Figures 7, 8:
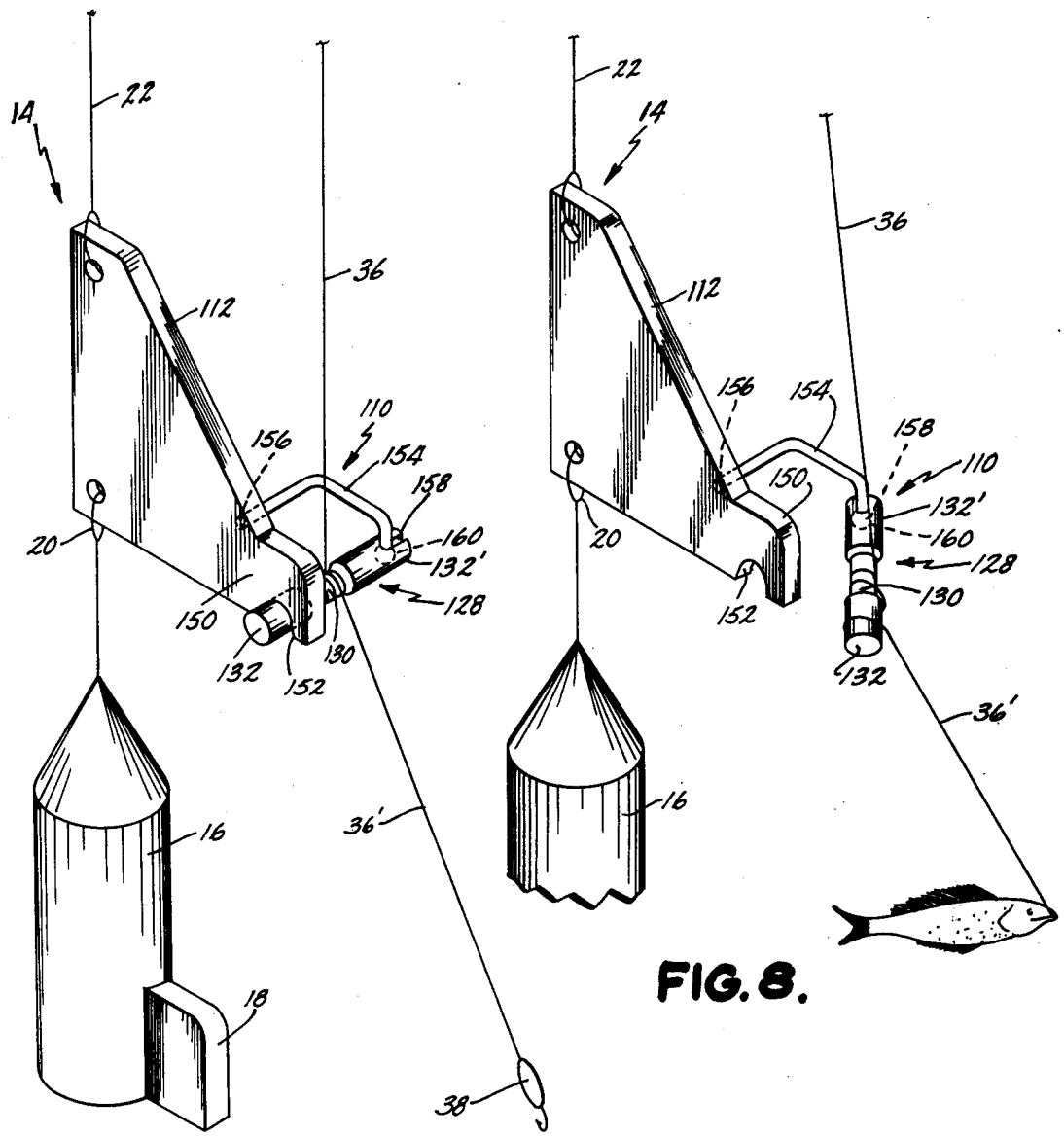
FIG. 7 is a perspective illustration of another embodiment of the invention.
FIG. 8 is a view similar to FIG. 7 illustrating the mechanism in a released position.

Referring to FIGS. 7 and 8, a somewhat modified embodiment of the invention is illustrated wherein like reference numerals corresponding to those of the embodiment previously described are utilized to identify corresponding parts. Those parts which differ from those previously described are designated by numerals having the prefix 100.

As in the previous embodiment, a weight element 16 having a fin 18 formed thereon is attached by means of a hook 20 or other convenient mechanism to the lower end of a support assembly 112. The upper end of support assembly 112 is secured to the suspension line 22. Support assembly 112 is generally triangular in configuration having an outwardly extending ear portion 150 formed thereon in which an upwardly opened socket 152 is formed.

The fitting element 128 is similarly configurated to that previously described having a reduced diameter center portion 130 and opposed enlarged end portions 132. One enlarged end portion 132' is adapted for pivotal mounting by means of a pivot arm 154 secured to support assembly 110. Pivot arm 154 is a generally L-shaped rod-like element having one end 156 secured in support assembly 112. The opposite end of the pivot arm is bent downwardly and has a ball element 158 formed thereon which is adapted to fit into a corresponding socket opening 160 formed in enlarged end 132' of fitting 128. Ball 158 and socket 160 formed in the fitting form a pivot joint for the fitting such that it can swivel in or out of socket 152 into the positions shown in FIGS. 7 and 8. In use, the fishing line 36 is wrapped several times around the reduced diameter portion 130 of the fitting and is positioned as shown in FIG. 7 as the weight is lowered such that the lure 38 is played out the desired distance. Upon the occurrence of a strike, the fitting is free to pivot out of socket 152, line 36 unwraps from the fitting such that the fish can be played in a conventional manner as shown in FIG. 8. As in the previous embodiment, fishing line 36 is maintained in position with respect to the weight and suspension line by maintenance of an upward force on fishing line 36. Upon relaxation of the force, the fitting is free to pivot out of its engaging position in socket 152 and the line is released.

This embodiment shown in FIGS. 7 and 8 differs from that previously described in that the fitting is not attached to the line and the line releases from the fitting upon the occurrence of a strike thus allowing complete freedom to play the fish. In the event of a missed strike or other release of the line, it is not necessary to retrieve the bait as the weight is simply raised out of the water, the bait end of the line is rewound around the reduced diameter portion of the fitting and the fitting is repositioned in the socket. This is particularly advantageous when the bait is trailed at a great distance from the fitting. In any event, in each of the embodiments shown, the ease of release allows the use of ultra-light tackle without the danger of breaking the pole or snapping the line. The bifurcated end portions of the legs can be formed as an integral part of the weight or they can form an individual unit used in conjunction with a conventional weight.

Having considered the structure and operation of the invention, it is appropriate to note that the hereinabove described apparatus for releasably supporting a fishing line on a downrigger line is a significant improvement in the art. The involved and complex devices of the prior art are completely eliminated. Since no mechanical connection is made to the line the possibility of weakening the line is avoided. When a strike occurs, the fishing line easily releases from the holding mechanism to allow the fish to be played. In addition, the fishing line can be released from the weight line by simply relaxing the force normally held on the line to maintain the fitting in the socket.

Obviously, many modifications and variations of the invention are possible in light of the above teachings and it will be readily apparent to those skilled in the art that various changes may be made. Accordingly, it is understood that within the scope of the appended claims, the present invention may be practiced in a manner other than is specifically described herein.

The embodiments of the invention in which an exclusive property or privilege is claimed are defined as follows.

1. Apparatus for releasably supporting a fishing line with respect to a downrigger line assembly including a suspension line and a weight, said release apparatus comprising:

a support member adapted for mounting on said downrigger line assembly, said support member having an extending portion forming a socket, said socket opening downwardly toward the weighted end of said suspension line;

a fitting having end portions at least one of which is adapted to be received in said socket; and means on said fitting adapted to receive a fishing line, said means being positioned generally between the ends of said fitting, said one end of said fitting being normally held in said socket with maintenance of a force on the fishing line, said fitting releasing from said socket with relaxation of said force.

2. The release apparatus of claim 1 wherein said support member is integrally formed with said weight, said extending portion forming a socket including a pair of arm members extending outwardly from said weight, the ends of said arm members having curved portions therein to form a pair of sockets, the end portions of said fitting having a radius of curvature corresponding to the curved portions forming said socket.

3. The release apparatus of claim 2 wherein said means on said fitting adapted to receive a fishing line includes a portion of said fitting between said end portions having an area of reduced cross section to receive turns of said line.

4. The release apparatus of claim 3 wherein said area of reduced cross section has an opening formed therethrough to receive said line.

5. The release apparatus of claim 1 wherein said support member is mounted above said weight on said suspension line.

6. The release apparatus of claim 5 wherein said extending portion forming a socket includes a pair of arm members extending from said support member, the ends of said arm members having curved portions therein to form a pair of sockets, the end portions of said fitting having a radius of curvature corresponding to the curved portions forming said sockets.

7. The release apparatus of claim 6 wherein said means on said fitting adapted to receive a fishing line includes a portion of said fitting between said end portions having an area of reduced cross section to receive turns of said line.

8. The release apparatus of claim 7 wherein said area of reduced cross section has an opening formed therethrough to receive said line.

9. The release apparatus of claim 1 wherein said extending portion forming a socket includes said support member having a curved opening formed along a lower surface thereof; said one end portion of said fitting having a radius of curvature corresponding to said curved opening.

10. The release apparatus of claim 9 and further including pivot means pivotally mounting the other end of said fitting whereby said one end of said fitting may be pivoted into and out of engagement with said socket, said fitting being held in said socket with maintenance of a force on said line.

11. The release apparatus of claim 10 wherein said pivot means includes a ball and socket housing assembly positioned on said support member and said other end portion of said fitting.

12. The release apparatus of claim 11 wherein said means on said fitting adapted to receive a fishing line includes a portion of said fitting between end portions having an area of reduced cross section to receive turns of said line.

13. The release apparatus of claim 12 wherein said support member is mounted above said weight on said suspension line.

14. Apparatus for releasably supporting a fishing line with respect to a downrigger line assembly including a suspension line and weight, said release apparatus comprising:

a support member adapted for mounting on said downrigger line assembly, said support member having an extending portion forming a socket, said socket opening downwardly toward the weighted end of said suspension line;

a fitting having enlarged end portions adapted to be received in said socket; and means on said fitting adapted to receive a fishing line, said means being positioned generally between the ends of said fitting, said fitting being normally held in said socket with maintenance of a force on the fishing line, said fitting releasing from said socket with relaxation of said force.

15. The release apparatus of claim 14 wherein said support member is integrally formed with said weight, said extending portion forming a socket including a pair of arm members extending outwardly from said weight, the ends of said arm members having curved portions therein to form a pair of sockets, the end portions of said fitting having a radius of curvature corresponding to the curved portions forming said socket.

16. The release apparatus of claim 14 wherein said support member is mounted above said weight on said suspension line and wherein said extending portion forming a socket includes a pair of arm members extending from said support member, the ends of said arm members having curved portions therein to form a pair of sockets, said end portions of said fitting having a radius of curvature corresponding to the curved portions forming said sockets.

17. Apparatus for releasably supporting a fishing line with respect to a downrigger line assembly including a suspension line and a weight, said release apparatus comprising:

a support member adapted for mounting on said downrigger line assembly, said support member having a portion forming a socket, said socket opening downwardly toward the weighted end of said suspension line;

a fitting having end portions at least one of which is adapted to be received in said socket; and means on said fitting adapted to receive a fishing line, said means being positioned generally between the ends of said fitting, said one end of said fitting being normally held in said socket with maintenance of a force on the fishing line;

pivot means pivotally mounting the other end of said fitting whereby said one end of said fitting may be pivoted into and out of engagement with said socket, said one end of said fitting releasing from said socket with relaxation of said force.

18. The release apparatus of claim 17 wherein said pivot means includes a ball and socket housing assembly positioned on said support member and said other end portion of said fitting.

* * * * *